UNITED STATES PATENT OFFICE.

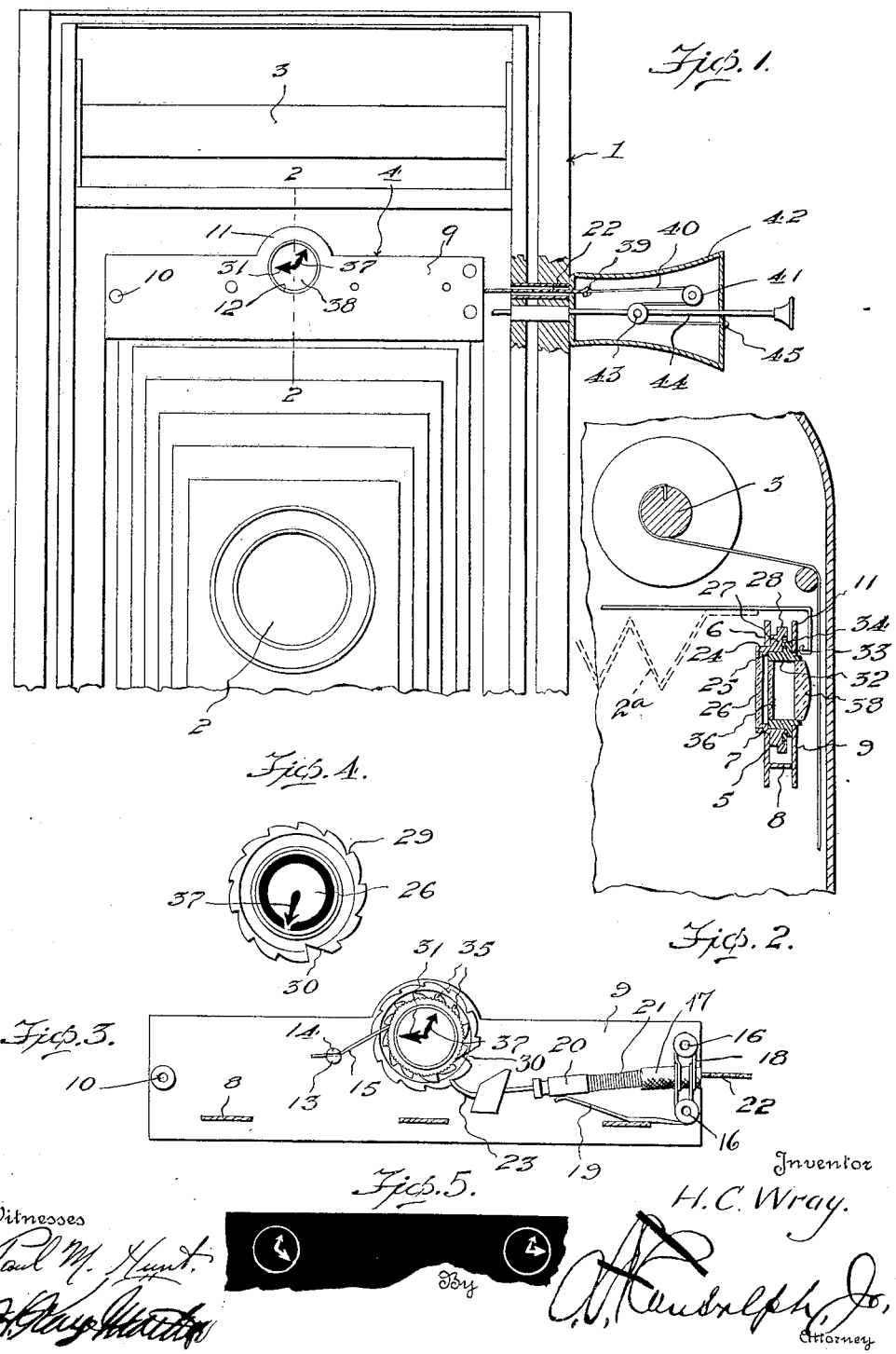

HARRY C. WRAY, OF NORTH BEND, OREGON.

CAMERA ATTACHMENT.

1,224,588. Specification of Letters Patent. Patented May 1, 1917.

Application filed December 30, 1914. Serial No. 879,763.

*To all whom it may concern:*

Be it known that I, HARRY C. WRAY, a citizen of the United States, residing at North Bend, in the county of Coos and State of Oregon, have invented certain new and useful Improvements in Camera Attachments; and I do hereby declare the following to be a full, clear, and exact description of the invention, such as will enable others skilled in the art to which it appertains to make and use the same.

This invention relates to new and useful improvements in camera attachments, and has for its principal object to provide an adjustable device by which the user may make a photographic impression upon the film, thus materially assisting him in the identification and classification of pictures.

Another object of the invention is to provide a simple and efficient device which is operated automatically at the time the film is exposed and make a photographic impression directly on the sensitized surface of the film, by which the film may be conveniently identified.

A further object of the invention is to provide a device which is capable of being used with plates as well as film cameras and which will give the necessary photographic impression on the film or plate without the necessity of receiving any attention from the operator.

With these and other objects in view, the invention consists in the novel combination and arrangement of parts which will be fully set forth in the following specification and accompanying drawings, in which, Figure 1 is fragmentary rear elevation, partly in section of a camera, the camera back being removed so as to clearly show the attachment as it would appear when applied thereto and showing a portion of the camera and attachment in section.

Fig. 2 is a transverse sectional view taken on line 2—2 of Fig. 1 illustrating the details of construction of the device.

Fig. 3 is a sectional view of the attachment, the rear plate being removed.

Fig. 4 is an enlarged view in elevation illustrating in detail the film indicating dial, and Fig. 5 is a fragmentary view of a film showing the effect of the indicator with the hand in two different positions.

Referring now to the drawings by characters of reference, the numeral 1 designates as an entirety the camera which is provided with the usual lens 2 mounted in the front end of the extensible bellows $2^a$ and film spool or holder 3. The attachment, which is designated generally by the numeral 4, is suitably secured in position adjacent one end of the exposure opening of the camera and will be more fully hereinafter described. This attachment 4 comprises the front plate 5 which is provided along one edge with the enlargement 6, located centrally of the plate. A suitable aperture 7 is formed in the plate 5 and enlargement 6 and is designed to receive the dials which will be more fully hereinafter described. This plate 5 is formed along its edge opposite the enlargement 6, with a plurality of slits and the portion of the plate between the slits are turned inwardly to provide spacing members 8 which are designed to hold the coöperating rear plate in operative position.

The rear plate above referred to, is designated by the numeral 9 and is essentially of the same structure as the front plate 5 and is secured to the latter by the spacing members 8 and rivets or equivalent fastening means 10. The plate 9 is provided with a suitable arcuate portion 11 which is also provided with the aperture 12. Each of these plates is provided with the stud 13 which is slit transversely as at 14 and designed to receive the end of the spring 15 which engages its respective disk and holds the same against backward movement. A pair of end rivets 16 are secured in one end of one of the plates, and these rivets coöperate in holding the plates in proper position. Extending around the rivets and designed to support the tubular guide member 17 are the wire loops 18 which are arranged to coöperate with each other and prevent the tubular guide member from becoming displaced.

A suitable spring 19 is supported on one of the rivets 16 and its end is directed angularly and engaging with a sleeve 20 which is connected to the tubular member 17 by the coil spring 21. A pawl 23 is connected with the inner end of a flexible member 22 and is secured to the sleeve 20, the flexible member 22 being extended outwardly through the tubular guide member 17.

Referring particularly to the disks hereinbefore mentioned which are best illustrated in Figs. 2, 3, and 4, the outer disk consists of the ring 24 which is notched as at 25 to receive the transparent plate 26. This ring is also provided at its inner edge with the outstanding flange 27, which flange is provided with the reduced flange 28 which is notched as at 29 to form ratchet teeth with which the pawl 23 coöperates. One of these teeth is cut deeper than the rest as at 30 and is designed to permit the pawl to engage one of the ratchet teeth of the inner disk, which will be more fully hereinafter described. The periphery of the flange 27 is preferably milled so that it will be held from accidental rotation by the spring pawls 15, and the transparent plate 26 has painted or otherwise marked thereon the translucent hand or indicator 31 which resembles the longer hand of a chronometer. The inner disk, which comprises the ring 32, is provided with the milled flange 33 which is arranged to be engaged by the spring 15 on the opposite plate, and this flange is provided with the reduced flange 34 which in turn is formed with the ratchet teeth 35, which run within an annular recess formed in the flange 28 of the ring 24 and are arranged to be engaged by the pawl 23 at the times that the deeper notch 30 of the flange 28 allows the pawl to come into engagement therewith.

This inner ring is recessed near one edge to receive the transparent disk 36 which is provided with the small indicator 37 which represents the shorter hand of a chronometer. A transparent plate 38 is secured to the rear end of the ring 32 and is provided with a convex rear surface which is presented to the film to insure against scratching or other injury to the latter as the several sections thereof are successively moved into postion behind the exposure opening of the camera. A suitable lens 38 is secured in the opposite end of this ring, and lies in close proximity to the film or plate of the camera in which the device is used.

In order to provide an operating means for the attachment, the flexible connection 22 is carried to the desired point on the exterior of the camera and is connected as at 39 to the flexible member 40 which passes over the stationary pulley 41 within the casing 42. This flexible connection then passes over the pulley 43 which is carried by the plunger 44, which plunger is connected in any suitable manner with the shutter actuating mechanism of the camera, and it will thus be seen that when the shutter is moved the same will cause pull to be exerted on the flexible connection 40, since the end opposite the end 39 is secured as at 45 and thereby exert pull on the flexible connection 22 which is connected to the pawl 23, and thus causes the pawl to be withdrawn from engagement with the ratchet teeth. When the plunger 44 is released the tension of the spring 21 moves the pawl 23 and flexible member 22 inwardly and the pawl 23 working against one of the ratchet teeth of the outer disk 24 imparts a slight rotational movement to the latter. The pawl 23 is normally retained in operative position against the teeth of the disk by the tension of the spring 19. After this outer disk has made a complete rotation, it is apparent that the pawl will engage within the deep notch 30 and cause the inner disk to move, thereby indicating to the user the fact that a new reel of films or set of plates is being used.

From the foregoing it will be apparent that the user at all times in provided with an authentic record of the number of the film or plate and also the number of the reel or plate holder, and thus titles may be affixed to the proper pictures with no danger of confusion.

While in the foregoing there has been shown and described the preferred embodiment of this invention, it is to be understood that such changes may be made in the combination and arrangement of parts as will fall within the spirit and scope of the invention as defined in the appended claims.

What is claimed is:

1. In a camera attachment, a casing adapted to be secured in the exposure opening of a camera, a ring rotatably mounted in said casing, a transparent disk secured in said ring and having an indicating mark thereon, external ratchet teeth on said ring, means for intermittently rotating said ring, and means to lock said ring against rotation in one direction.

2. In a camera attachment, a casing, transparent disks rotatably mounted in said casing, each disk having an indicating hand marked thereon, rings inclosing said disks, and means for intermittently rotating said rings and disks.

3. In a camera attachment, a casing, relatively large and small rings rotatably mounted in said casing, disks secured in said rings and each disk having an indicating hand marked thereon, external ratchet teeth formed upon said rings, a slidable spring member normally engaged with the ratchet teeth of the relatively large ring to intermittently rotate the latter, said large ring having a peripheral recess of such depth as to permit said spring means to engage the ratchet teeth and effect a rotary movement of the relatively small ring, and means to lock said rings against rotational movement in one direction.

In testimony whereof I affix my signature in presence of two witnesses.

HARRY C. WRAY.

Witnesses:
    JNO. H. GREVES,
    H. L. BERGMAN.

Copies of this patent may be obtained for five cents each, by addressing the "Commissioner of Patents, Washington, D. C."